(No Model.)

E. B. CHIPMAN.
PORTABLE COOKER.

No. 558,776.  Patented Apr. 21, 1896.

Witnesses:— Horace G. Dietz, James H. Palk

Inventor:— Elisha B. Chipman

By his Attorney, David A. Gourick

UNITED STATES PATENT OFFICE.

ELISHA B. CHIPMAN, OF SAVANNAH, GEORGIA.

PORTABLE COOKER.

SPECIFICATION forming part of Letters Patent No. 558,776, dated April 21, 1896.

Application filed August 7, 1894. Serial No. 519,675. (No model.)

*To all whom it may concern:*

Be it known that I, ELISHA B. CHIPMAN, a citizen of the United States, residing in the city of Savannah, in the county of Chatham and State of Georgia, have invented a new and useful Improvement in Portable Cookers, of which the following is a specification.

My invention relates to cookers for culinary purposes, and is intended to be used in connection with lamps or gas-jets having the flame encircled with ordinary chimneys which conduct the heat employed in the cooking to an aperture in the bottom of the pan upon which rests the plate and other parts of the invention that will be hereinafter more fully described.

Figure 1:
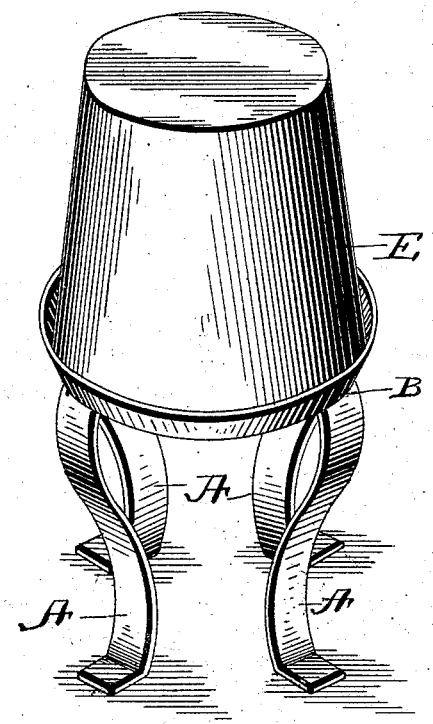
Figure 2:
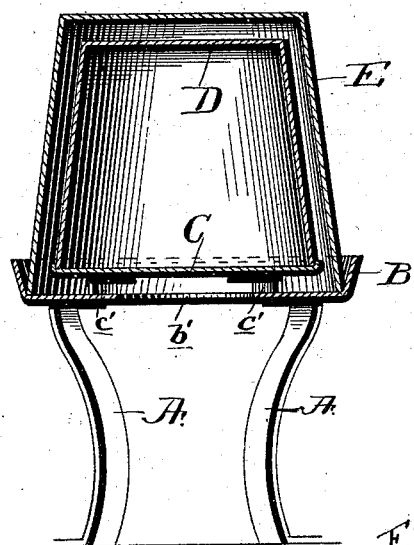

In the sheet of drawings accompanying the specification, Figure 1 is a perspective view of my improved cooker, and Fig. 2 is a vertical sectional view on a line drawn through the center.

A represents the legs which support the pan B, on which rests the plate C, upon which stands the inside cover D.

E represents the outside cover, which sits upon the pan B, enveloping the inside cover D and extending beyond and below the plate C and is about two inches longer and broader than the inner cover D.

The legs A may be of any suitable material and of sufficient length to bring the aperture $b'$ immediately above and over the top of the chimney surrounding the flame, from which the heat arises and enters said aperture $b'$, and striking the under side of the plate C spreads outward and upward circulating in the space between the sides and tops of the covers D and E, said aperture $b'$ being in the center of the pan B and large enough to receive the top of the chimney.

The pan B has its edge turned upward, forming a rim to go around the edge of the open end of the outer cover E, so as to retain the heat, as will hereinafter more fully appear, and the plate C, which is preferably made of copper and about two inches less in diameter than the pan B, also has its edge turned upward to form a rim around the edge of the open end of the inside cover D and rests upon short legs $c'$ about one inch long which rest upon the pan B.

The parts or any of them may be constructed of tin or other suitable sheet metal; but I prefer to make the outside cover E of wood lined with asbestos or other fireproof material to protect it and retain the heat.

The various parts of my invention being thus described it is obvious that my improved cooker consists particularly of the pan B, through which the heat enters, the plate C on which the article to be cooked is placed, the cover D, which, fitting nicely within the upturned edge of the plate C, forms a chamber for the article placed upon the plate C and protects it from coming in contact with any gases or noxious fumes that may enter the cooker with the heat, and the outside cover E, by fitting closely to the pan B inside of its outer edge, prevents the heat from escaping and causes the heat to circulate around and above the cooking-chamber within the space of about an inch between it and the cover D forming the cooking-chamber.

In operation I place the pan B over the chimney surrounding the flame of the lamp or gas-burner used. Then I place the plate C upon the pan, and upon said plate I place the article to be cooked. Then over that I place the inside cover D, with the edge of its open end in close contact with plate C inside of its upturned edge, and over that the outside cover E is placed, with the edge of its open end resting upon the pan B inside of the rim formed by the upward curve of its edge.

It is obvious that in lieu of the legs A a frame or similar support may be used, that blocks or other ordinary supports may be substituted for the legs $c'$, and that the upper end of the chimney may extend into the aperture $b'$ or not at the pleasure of the person using my improved cooker. It is also obvious that I do not restrict my invention to dimensions given, but use them as the preferred size for ordinary purposes.

Having thus described my invention, what I claim, and desire to secure by Letters Patent, is—

In a portable cooker, the combination with a base-plate provided with supporting-legs and a circular opening through the middle thereof, an upwardly-turned flaring annular rim thereon formed integral therewith, a removable imperforate pan, its circumference provided with an upwardly-turned rim, said pan provided with supports resting on the base-plate, a removable imperforate hood, its
5 edges resting on said pan, a removable imperforate jacket covering said hood at a distance therefrom, its edges resting on the base-plate and in contact with the flaring annular rim thereon, substantially as described and shown.

ELISHA B. CHIPMAN.

Witnesses:
W. N. BECKETT,
C. E. DUNAWAY.